(12) United States Patent
Conger et al.

(10) Patent No.: US 10,508,681 B1
(45) Date of Patent: *Dec. 17, 2019

(54) DRIVE SHAFT DAMPER

(71) Applicant: Caraustar Industrial and Consumer Products Group, Inc., Austell, GA (US)

(72) Inventors: Gary A. Conger, Hemlock, MI (US); Peter T. Tkacik, Fort Mill, SC (US); Martin H. Stark, Saginaw, MI (US); David A. Galonska, Saginaw, MI (US); Josh Wolfenbarger, Ida, MI (US)

(73) Assignee: Caraustar Industrial and Consumer Products Group, Inc., Austell, GA (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/461,825

(22) Filed: Mar. 17, 2017

Related U.S. Application Data

(60) Continuation of application No. 14/317,636, filed on Jun. 27, 2014, now Pat. No. 9,599,147, which is a division of application No. 13/681,851, filed on Nov. 20, 2012, now Pat. No. 8,801,526, which is a continuation-in-part of application No. 12/650,763, filed on Dec. 31, 2009, now abandoned.

(60) Provisional application No. 61/141,952, filed on Dec. 31, 2008, provisional application No. 61/143,610, filed on Jan. 9, 2009.

(51) Int. Cl.
*F16C 3/02* (2006.01)
*F16F 15/32* (2006.01)

(52) U.S. Cl.
CPC ............ *F16C 3/023* (2013.01); *F16F 15/322* (2013.01)

(58) Field of Classification Search
CPC .......................... Y10T 464/50; F16C 2326/06
See application file for complete search history.

(56) References Cited

U.S. PATENT DOCUMENTS

| | | |
|---|---|---|
| 3,075,406 A | 1/1963 | Butler, Jr. et al. |
| 3,430,543 A | 3/1969 | Cunningham |
| 4,331,305 A | 5/1982 | Marquis et al. |
| 4,454,734 A | 6/1984 | Marquis et al. |
| 4,507,351 A | 3/1985 | Johnson et al. |
| 4,621,508 A | 11/1986 | Baxley, Jr. et al. |
| 4,909,361 A | 3/1990 | Stark et al. |
| 5,094,404 A | 3/1992 | BesRosiers et al. |
| 5,331,737 A | 7/1994 | Jarvela |
| 5,571,883 A | 11/1996 | Jourdain et al. |
| 5,643,093 A | 7/1997 | Breese |

(Continued)

FOREIGN PATENT DOCUMENTS

WO 2008/005863 A2 1/2008

OTHER PUBLICATIONS

Higgins, R.A., "Properties of Engineering Materials," 2nd ed. Industrial Press Inc., 1994, p. 314.

(Continued)

*Primary Examiner* — Matthieu F Setliff
(74) *Attorney, Agent, or Firm* — Additon, Higgins & Pendleton, P.A.

(57) ABSTRACT

A drive shaft damper may be inserted into a hollow automotive drive shaft. The damper includes both foam and a non-foamed retaining member positioned on its outer surface. The foam, which extends above the damper's outer surface, typically possesses a maximum operating temperature of 175° C. or higher.

20 Claims, 15 Drawing Sheets

(56) References Cited

U.S. PATENT DOCUMENTS

| | | | |
|---|---|---|---|
| 5,673,437 | A | 10/1997 | Chase et al. |
| 5,699,683 | A | 12/1997 | Rieker |
| 5,904,622 | A | 5/1999 | Breese et al. |
| 5,924,531 | A | 7/1999 | Stark et al. |
| 5,976,021 | A | 11/1999 | Stark et al. |
| 6,234,911 | B1 | 5/2001 | Breese et al. |
| 6,247,346 | B1 | 6/2001 | Dickson, Jr. |
| 6,370,756 | B1 | 4/2002 | Conger et al. |
| 6,520,678 | B2 | 2/2003 | Aiken et al. |
| 6,662,423 | B2 | 12/2003 | Menosky et al. |
| 6,719,230 | B2 | 4/2004 | Baranov et al. |
| 6,752,722 | B2 | 6/2004 | Armitage et al. |
| 6,854,685 | B2 | 2/2005 | Couchey |
| 7,083,523 | B2 | 8/2006 | Haile et al. |
| 7,774,911 | B2 | 8/2010 | Sun et al. |
| 8,176,613 | B2 | 5/2012 | Sun et al. |
| 8,528,180 | B2 | 9/2013 | Sun et al. |
| 8,801,526 | B1 | 8/2014 | Conger et al. |
| 8,832,941 | B1 | 9/2014 | Pennington et al. |
| 8,863,390 | B1 | 10/2014 | Ley et al. |
| 9,033,807 | B1 | 5/2015 | Ley et al. |
| 9,175,718 | B1 | 11/2015 | Ley et al. |
| 9,599,147 | B1 | 3/2017 | Conger et al. |
| 9,890,808 | B2 | 2/2018 | Wang |
| 9,933,020 | B2 | 4/2018 | Leko et al. |
| 10,018,244 | B2 | 7/2018 | Ley et al. |
| 2005/0049054 | A1 | 3/2005 | Laskey |
| 2007/0087848 | A1 | 4/2007 | Larsen et al. |
| 2009/0005183 | A1 | 1/2009 | Baumhauer et al. |
| 2009/0015913 | A1 | 1/2009 | Bratt et al. |
| 2009/0048031 | A1 | 2/2009 | Conger et al. |
| 2018/0313428 | A1 | 11/2018 | Ley et al. |

OTHER PUBLICATIONS

Dow Corning, Product information on Dow Corning's 3-8186 Thixotropic Foam, Midland, MI (1997), pp. 1-2.

Dow Corning, Material Safety Data Sheet, Dow Corning(R) 3-8186 Thixotropic Foam Part B, Midland, MI, pp. 1-7, Feb. 6, 2002.

Dow Corning, Material Safety Data Sheet, Dow Corning(R) 3-8186 Thixotropic Foam Base, Midland, MI, pp. 1-7, Sep. 26, 2002.

Siversten, Katrine, Polymer Foams, Spring 2007, Massachusetts Institute of Technology, Polymer Physics 3.063, pp. 1-17.

A & D Rubber Products Company [online] Dec. 17, 2003 {retrieved on Aug. 12, 2009} Retrieved from the Internet: URL http://web.archive org/web/20031217073911/http://adrubber.com/materials.html, pp. 1-5.

International Search Report and Written Opinion in commonly owned International Application No. PCT/US2007/072529 dated Aug. 5, 2008.

International Preliminary Report on Patentability in commonly owned International Application No. PCT/US2007/072529 dated Jan. 6, 2009.

Sun, Zhaohui et al., "Attenuation of Driveline Vibrations through Tuning of Propeller Shaft Liners", SAE International, May 17, 2011, pp. 1-8.

Ley, Jason et al., "Optimization of Propshaft Liner Tuning and Damping: A SYLENT Approach", SAE International, Jun. 15, 2015, pp. 1-5.

ABSORBER w/BARRIER

DRIVE SHAFT DAMPER

CROSS-REFERENCE TO PRIORITY APPLICATIONS

This application is a continuation of U.S. patent application Ser. No. 14/317,636 for a Drive Shaft Damper, (filed Jun. 27, 2014), now U.S. Pat. No. 9,599,147, which itself is a division of commonly assigned U.S. patent application Ser. No. 13/681,851 for a Foamed Drive Shaft Damper, (filed Nov. 20, 2012), now U.S. Pat. No. 8,801,526, which itself is a continuation-in-part of commonly assigned U.S. patent application Ser. No. 12/650,763 for a Foamed Drive Shaft Damper (filed Dec. 31, 2009), now abandoned, which itself claims the benefit of U.S. Patent Application No. 61/141,952 for a Foamed Drive Shaft Damper (filed Dec. 31, 2008), and U.S. Patent Application No. 61/143,610 for a Foamed Drive Shaft Damper (filed Jan. 9, 2009). Each of the foregoing commonly assigned patent applications is hereby incorporated by reference in its entirety.

FIELD OF THE INVENTION

The invention relates to a foamed drive shaft damper adapted for use in a hollow automotive drive shaft to dampen vibrations and attenuate sound in vehicles, such as cars, trucks, tractors, and heavy machinery. The invention further relates to methods of forming and using such foamed drive shaft dampers.

BACKGROUND

An automobile conventionally employs a hollow, tubular drive shaft to transmit torque from the transmission to the differential gears. Such drive shafts often produce annoying NVH (i.e., noise, vibration, and harshness). Accordingly, it is desirable to dampen NVH to provide for a quieter and smoother ride. Furthermore, it is desirable to prevent vibration to avoid mechanical failure from the loosening of assembled vehicle parts.

Several commonly assigned patents address NVH reduction. For example, U.S. Pat. No. 4,909,361 to Stark et al. discloses a drive shaft damper having a base tube or core formed of helically wound paper. A helical retaining strip, such as ethylene propylene diene monomer rubber (i.e., EPDM) is fixed to the core to engage the bore of the drive shaft.

Another example is U.S. Pat. No. 5,976,021 to Stark et al. U.S. Pat. No. 5,976,021 improves the drive shaft damper disclosed in U.S. Pat. No. 4,909,361 by including sealed ends and an innermost layer of waterproof material, such as aluminum foil.

Yet another example is U.S. Pat. No. 5,924,531 to Stark et al. U.S. Pat. No. 5,924,531 discloses a vibration damping shaft liner having a cylindrical core and a corrugated layer wound around the core in alternating helical grooves and flutes.

Each of the above-referenced patents is herein incorporated by reference in its entirety.

The drive shaft dampers disclosed in the foregoing, commonly assigned patents are well suited for their intended purposes. That notwithstanding, ever more manufacturers are producing drive shafts having standardized end diameters. Such drive shafts accommodate universal joint flanges, which attach the drive shaft to the gearboxes and differentials in motor vehicles. This standardization is achieved by reducing the diameter at the respective drive shaft ends, a process referred to as "swaging."

The reduction of the drive shaft ends necessitates the insertion of the damper into the drive shaft prior to the swaging process. Thereafter, the drive shaft is heat treated under extreme conditions (e.g., 350° F.) for a period sufficient to strengthen the drive shaft (e.g., about 6-8 hours).

Accordingly, there is a need for drive shaft dampers that can provide improved NVH reduction and withstand the extreme heat conditions required for modern drive shaft manufacturing. In particular, there is a need for resilient and durable drive shaft dampers that can be inserted into drive shafts prior to swaging and that can be manufactured efficiently and cost-effectively.

SUMMARY

It is an object of the present invention to provide a drive shaft damper that minimizes NVH.

It is a further object of the present invention to provide a drive shaft damper that can withstand extreme conditions such as heat treatment of drive shafts.

It is yet a further object of the present invention to provide a drive shaft damper that has superior resistance to in-use deterioration (i.e., while installed and used in a vehicle).

It is yet a further object of the present invention to provide a drive shaft damper that, once positioned, stays fixed within the drive shaft.

It is yet a further object of the present invention to provide a dampened hollow drive shaft that includes a hollow drive shaft and a convolute or spirally wound damper secured within the drive shaft.

It is yet a further object of the present invention to provide a drive shaft damper that possesses greater resistance to corrosive chemicals that may be encountered during the manufacturing of drive shafts (e.g., drive shafts with swaged ends).

It is yet a further object of the present invention to provide a foamed drive shaft damper that can be manufactured efficiently and cost-effectively.

The foregoing illustrative summary, as well as other exemplary objectives and/or advantages of the invention, and the manner in which the same are accomplished, are further explained within the following detailed description and its accompanying drawings.

DETAILED DESCRIPTION

The invention embraces a tubular drive shaft damper having extruded foam applied (e.g., adhesively bonded or otherwise secured) to the outer surface, thereby providing superior NVH-reduction properties and superior heat resistance. The invention also embraces a dampened hollow drive shaft having the foamed damper frictionally positioned therein. In addition, the invention embraces a method of manufacturing the foamed drive shaft damper and the hollow dampened drive shaft.

Figure 7A:
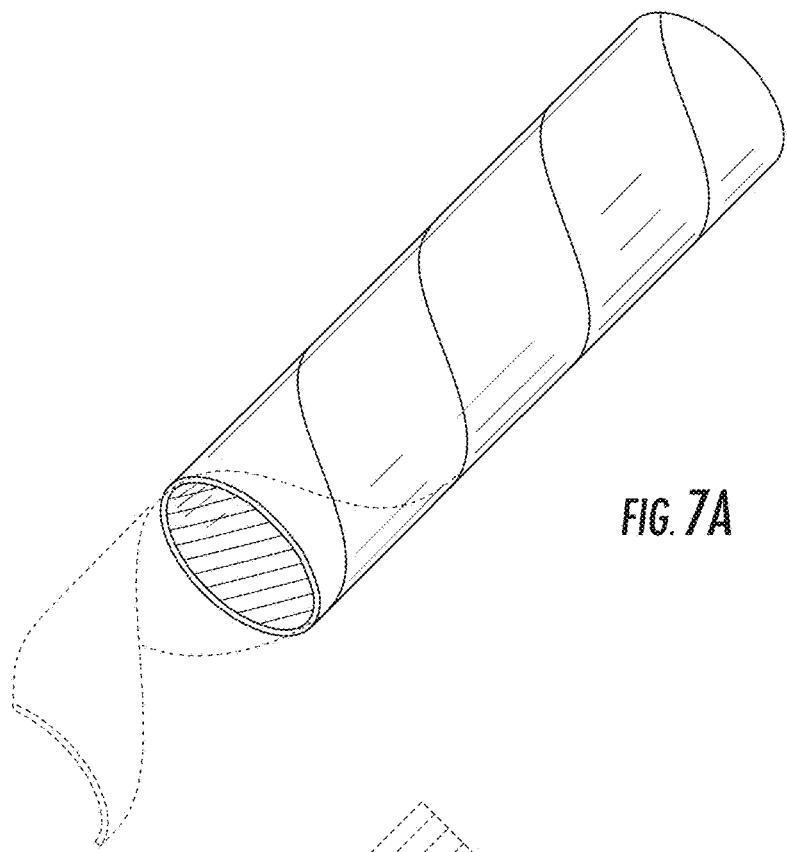
FIGS. 7A-7B schematically depict exemplary substantially cylindrical structures.
Figure 7B:
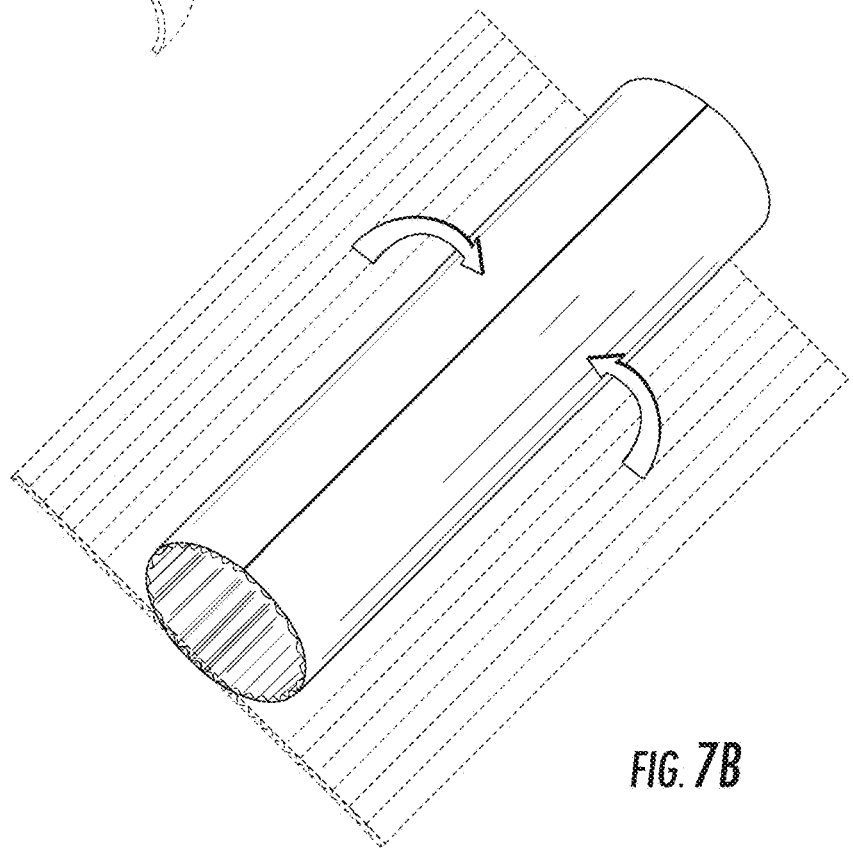

In one aspect, the invention is a drive shaft damper formed of a substantially cylindrical structure, such as a convolute tube or, more typically, a spirally wound tube. See FIGS. 7A and 7B. The substantially cylindrical structure itself is typically formed of fibrous material, such as paper or other polymeric material. In addition, the substantially cylindrical structure has foam deposited upon (or otherwise applied to) its outer surface. Thus, it is referred to as a "foamed drive shaft damper."

Figure 2A:
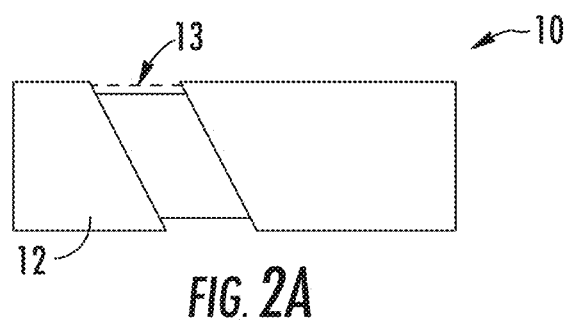
FIGS. 2A-2C schematically depict a section of an exemplary drive shaft damper.
Figure 2B:
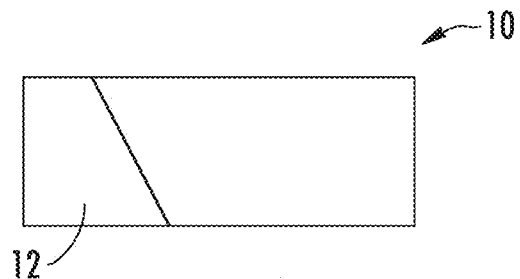
Figure 2C:
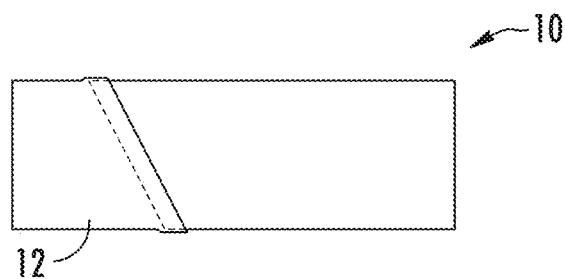

The substantially cylindrical structure of the drive shaft damper is typically made up of one or more spirally wound plies. These plies may be configured to form seam gap joints, butt joints, and/or overlap joints. See FIGS. 2A-2C. The spirally wound plies may also include one or more moisture-resistant layers. In addition, the spirally wound plies may include one or more adhesive layers positioned between adjacent plies so that adjacent plies are affixed to one another.

In another aspect, the invention is a method of making foamed drive shaft dampers with superior NVH-reduction properties and heat resistance. This may include depositing (e.g., by extruding) foam (e.g., an elastomeric foam) on the outer surface of the substantially cylindrical structure.

Typically, this includes applying the foam after the construction of the substantially cylindrical structure. After the formation of the substantially cylindrical structure, the foam is applied to the outermost layer thereof (e.g., in one or more beads).

Alternatively, this includes the application of the foam to the outer surface of the substantially cylindrical structure's outermost layer prior to the formation of the drive shaft damper. Typically, foam is extruded onto a strip of paperboard having a constant width (i.e., between two and six inches) and an indeterminate length.

Thereafter, the foam is cured (e.g., by letting it stand for the appropriate time, such as about ten minutes or so). The foamed strip is then typically spirally wound to form a tube.

Typically, the foamed strip comprises a plurality (i.e., at least two) of foam beads. Typically, the foam beads are positioned parallel to each other along the length of the strip. This enables a balanced winding of the foamed strip to construct the substantially cylindrical structure.

In another aspect, the invention is a method of making dampened drive shafts with superior NVH-reduction properties and heat resistance. Typically, this includes inserting the foamed damper into a tubular drive shaft, then swaging the ends of the drive shaft by rolling the ends under high radial pressure using shaped rollers (i.e., roll swaging).

Thereafter, the drive shaft is heated to a temperature of 350° F. for a period sufficient to increase its strength and wear (e.g., between about 4 to 12 hours).

In another aspect, the invention is a dampened tubular drive shaft with swaged ends. The dampened tubular drive shaft includes the foamed drive shaft damper according to the foregoing description. A portion of the tubular drive shaft may possess a substantially fixed inner diameter between its swaged ends, thereby providing space for the present foamed damper to be positioned (i.e., within the drive shaft's substantially fixed inner diameter). This dampened drive shaft is typically formed of metal (e.g., aluminum).

Figure 8:
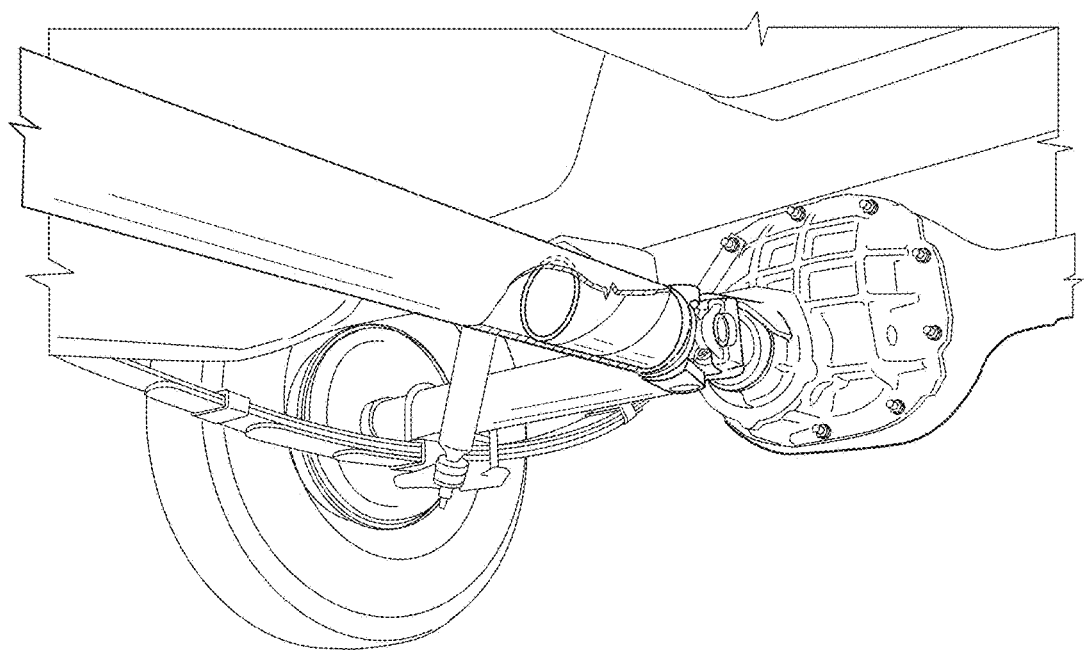
FIG. 8 depicts an exemplary vehicle comprising an exemplary drive shaft damper.
Figure 9:
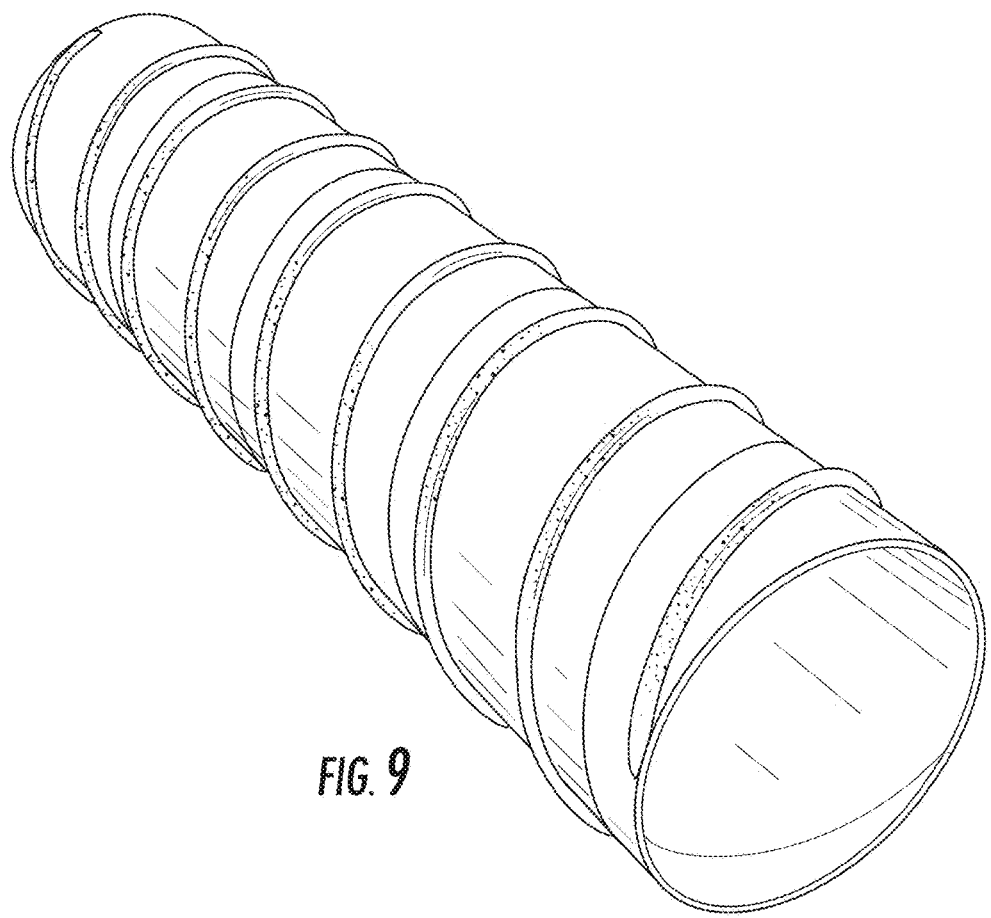
FIG. 9 schematically depicts an exemplary drive shaft damper having a helical foam bead.

In yet another aspect, the invention embraces a vehicle that includes this kind of dampened drive shaft. See FIG. 8.

Figure 1:
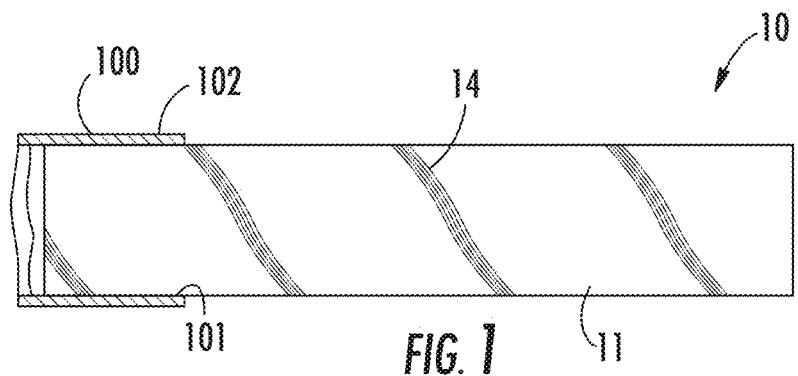
FIG. 1 schematically depicts an exemplary drive shaft damper having extruded foam applied spirally onto its outer surface.

FIG. 1 depicts an exemplary foamed drive shaft damper 10 positioned within a tubular drive shaft 100. The drive shaft 100 has an inner surface 101 and an outer surface 102. The drive shaft damper 10 is partly characterized by its substantially cylindrical structure 11. Thus, the outer surface of the substantially cylindrical structure 11 is positioned adjacent to the inner surface 101 of the drive shaft 100.

In this exemplary embodiment, the substantially cylindrical structure 11 of the drive shaft damper 10 is formed by several layers of spirally wound plies 12. See FIG. 2. Adjacent spirally wound plies may be bound together by respective adhesive layers 13. That is, an adhesive layer 13 is positioned between adjacent spirally wound plies 12. The strip comprising the outermost ply typically has foam applied to its outer surface. For instance, each ply may be formed from a 2-inch to 6-inch strip of spirally wound paperboard. See FIG. 2.

Alternatively, the substantially cylindrical structure 11 can be, for example, a convolute tube (e.g., using one or more convolute plies). See FIG. 7B. The outermost ply has foam applied to its outer surface.

Typically, one or more beads of foam 14 are positioned on the outer surface of the substantially cylindrical structure 11. Foamed silicone may be used as foam beads 14 in the present invention. Those having ordinary skill in the art will appreciate that foamed silicone has high-temperature resistance. A suitable silicone for use in the present drive shaft damper is Dow Corning's 3-8186 Thixotropic Foam. U.S. Patent Application Nos. 61/141,952 and 61/143,610, which, as noted, are incorporated by reference, disclose additional product information, including an MSDS, with respect to Dow Corning's 3-8186 Thixotropic Foam.

In one embodiment, the foam beads 14 are spirally positioned around the substantially cylindrical structure 11 (e.g., deposited in a substantially spiral pattern), typically along the entire length of the substantially cylindrical structure 11. See FIG. 1.

Figure 3:
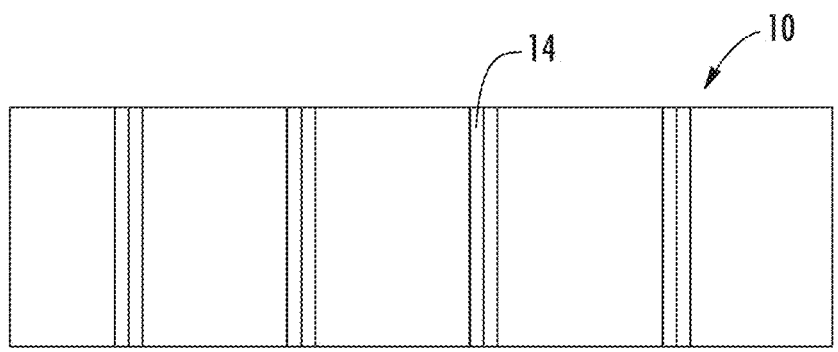
FIG. 3 schematically depicts an exemplary drive shaft damper having circumferentially positioned foam beads.

In another such embodiment, the foam beads 14 are circumferentially positioned about the substantially cylindrical structure 11. See FIG. 3.

Figure 4:
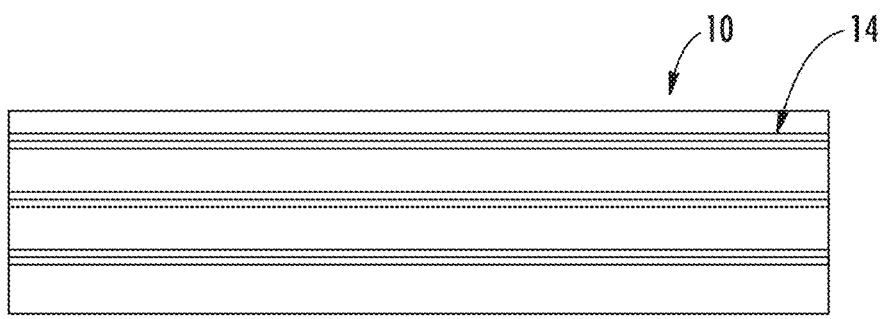
FIG. 4 schematically depicts an exemplary drive shaft damper having axially positioned foam beads.

In yet another embodiment, the foam beads 14 are positioned substantially parallel to the central axis of the substantially cylindrical structure 11 (i.e., longitudinally along the substantially cylindrical structure 11). See FIG. 4.

Figure 5A:
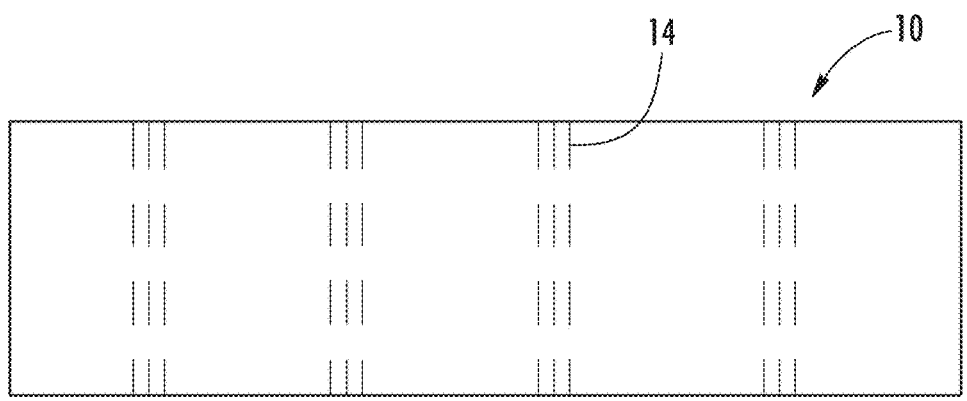
FIG. 5A schematically depicts an exemplary drive shaft damper having foam segments positioned intermittently upon its outer surface.
Figure 5B:
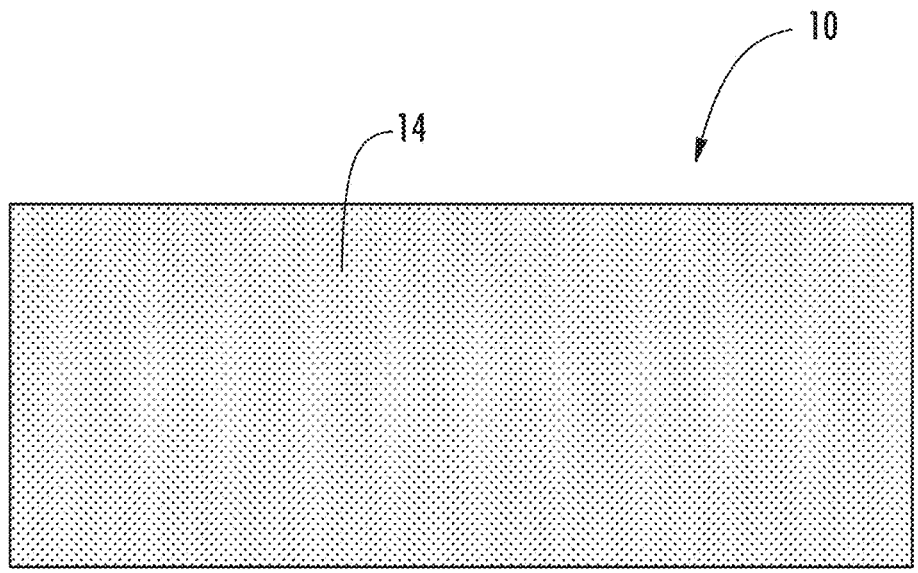
FIG. 5B schematically depicts an exemplary drive shaft damper having foam substantially covering its entire outer surface.
Figure 5C:
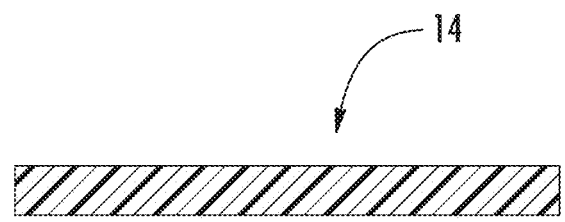
FIG. 5C schematically depicts a cross sectional profile of foam having a constant thickness.
Figure 5D:
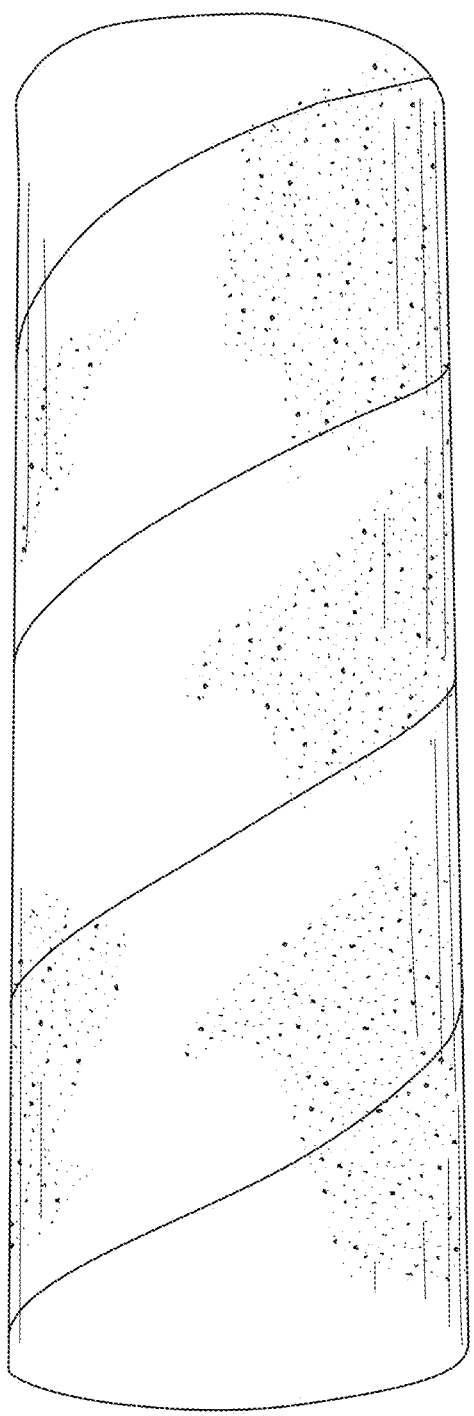
FIGS. 5D-5E schematically depict exemplary drive shaft dampers having foam substantially covering the outer surface, both with and without a spirally wound, non-foamed retaining member.
Figure 5E:
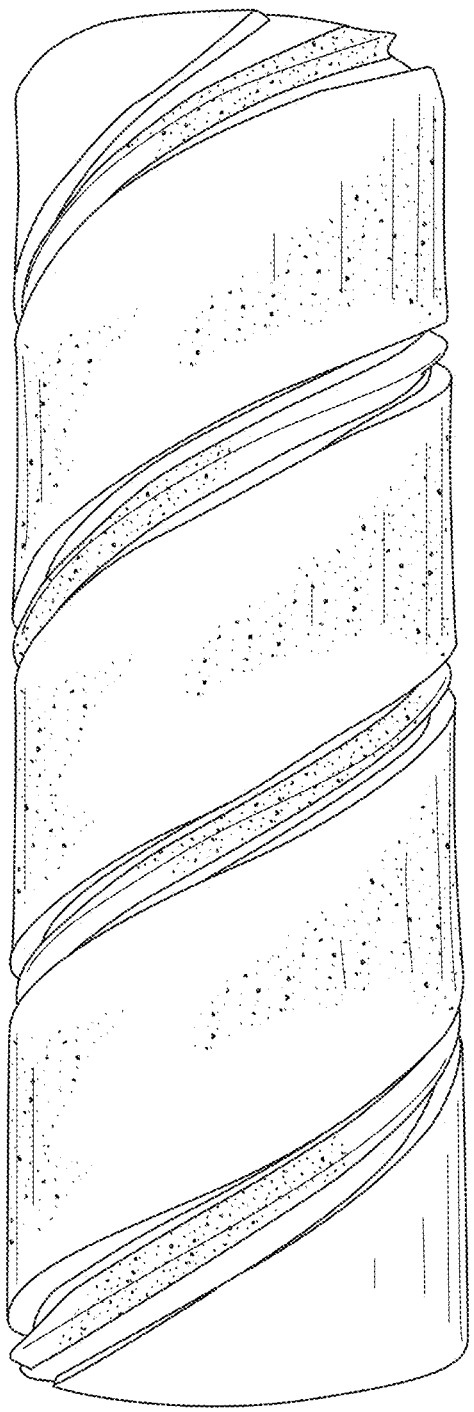
Figure 6A:
FIGS. 6A-6G schematically depict an idealized foam bead cross-sectional profile.
Figure 6B:
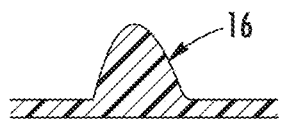
Figure 6C:
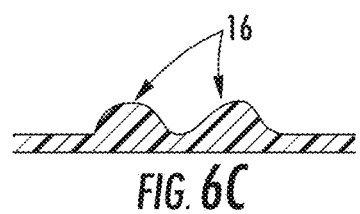
Figure 6D:
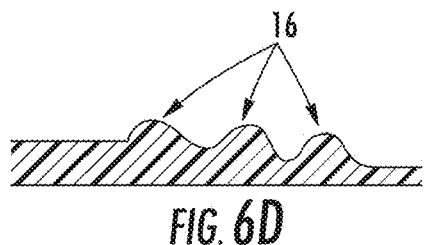
Figure 6E:
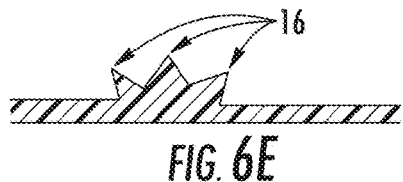
Figure 6F:
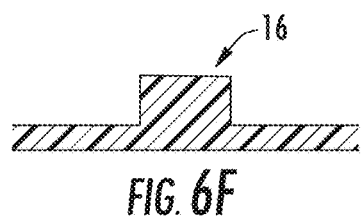
Figure 6G:
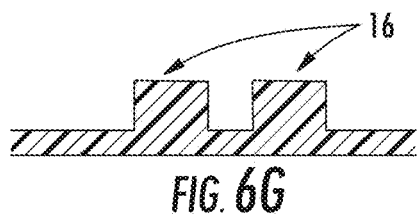

In yet another embodiment, the foam beads 14 are positioned intermittently throughout the outer surface of the substantially cylindrical structure 11. See FIG. 5A.

In yet another embodiment, the foam covers substantially the entire outer surface of the substantially cylindrical structure 11, typically in a constant foam thickness. See FIGS. 5B-5E.

In yet another embodiment, the thickness of the foam might be varied along the cylindrical structure 11 (i.e., the foam thickness is not constant) (e.g., by applying foam beads of differing thickness) in order to selectively dampen multiple (i.e., more than one) NVH-causing frequencies.

In yet another embodiment, the foam's density and/or the wall thickness of the substantially cylindrical structure (e.g., a paperboard tube) can be selected so as to dampen a particularly problematic resonance frequency (i.e., to provide a tuned drive shaft damper).

By way of explanation, the foam 14 and substantially cylindrical structure 11 operate as a spring-mass system. Those having ordinary skill in the art will appreciate that a spring-mass system can be used to dampen vibration by moving the mass out of phase with the vibration source.

By way of further explanation, the foam 14 represents the spring and the substantially cylindrical structure 11 represents the mass in this spring-mass system. Because the foam density and the wall thickness of the substantially cylindrical structure can be varied to dampen specific resonance frequencies, the foamed drive shaft damper 10 of the present invention serves as a tuned mass damper (i.e., an active mass damper or harmonic absorber).

Those having ordinary skill in the art will recognize that in any of these configurations the silicone foam will bond (i.e., adhere) to the substantially cylindrical structure 11 such that the foam 14 will remain in place while the damper 10 is placed inside the drive shaft tube 100.

Typically, the foam 14 is positioned on the substantially cylindrical structure 11 such that the protuberance or protuberances 16 created by the foam extends beyond the outer surface of the substantially cylindrical structure 11. See FIGS. 6A-6G. Typically, the protuberance extends about 0.2 inch or more (e.g., between about 0.245 and 0.255 inch) above the outer surface of the substantially cylindrical structure 11.

Thus, the foam 14 extends above the outermost surface of the substantially cylindrical structure 11 in the form of a protuberance 16 (e.g., a foam protrusion on a paperboard core). See FIGS. 6A-6G. (As noted above, FIGS. 6A-6G schematically represent cross-sectional profiles for the foam bead.) This ensures that the drive shaft damper 10 is capable of being frictionally positioned within the inner annular space of the tubular drive shaft 100.

In other words, the maximum radius of the foamed drive shaft damper 10 is defined by the highest protuberance 16 of the foam beads 14. Moreover, the maximum radius of the drive shaft damper 10 is greater than the radius defined by the inner annular space of the tubular drive shaft 100. As depicted in FIG. 1, the radius defined by this inner annular space refers, for example, to that part of the tubular drive shaft 100 that possesses a substantially fixed inner diameter (i.e., between the swaged ends). In this way, the drive shaft damper 10, once positioned within the drive shaft 100, stays frictionally secured.

Thus, upon insertion of the foamed damper 10 into the drive shaft 100, the applied foam 14 (e.g., foam beads) is compressed between the substantially cylindrical structure 11 and the inner annular space of the tubular drive shaft 100. This helps increase the surface area of the foam 14, which may improve dampening properties of the foamed drive shaft damper.

In one embodiment of the drive shaft damper, the substantially cylindrical structure 11 includes at least one ply of corrugated paper or paperboard (e.g., one or more single-faced corrugated plies). See FIGS. 5D, 7A, and 7B.

In another embodiment of the drive shaft damper, the substantially cylindrical structure 11 includes an outermost layer of corrugated paper or paperboard.

In yet another embodiment, the substantially cylindrical structure 11 includes an outermost layer of (non-corrugated) paperboard (i.e., having a smooth surface). Surprisingly, a drive shaft damper configuration in which the outermost layer is formed of smooth-surface paperboard seems to have better noise attenuation as compared with a configuration in which the outermost layer is formed of corrugated paperboard.

Table 1 (below) compares the damping ratios at various similar frequencies for a drive shaft without a foamed damper and a drive shaft with a foamed damper. Those having ordinary skill in the art will recognize that a damping ratio greater than 1.0 represents an overdampened system. A damping ratio less than 1.0 represents an underdampened system, and a damping ratio equal to 1.0 represents a critically dampened system.

TABLE 1

| Drive Shaft Having No Damper | | Drive Shaft with Foamed Damper (2 Beads of Foam) | |
| --- | --- | --- | --- |
| Frequency (Hz) | Damping Ratio | Frequency (Hz) | Damping Ratio |
| 339 | 0.262 | 305 | 2.000 |
| 438 | 0.139 | 477 | 2.113 |
| 590 | 0.154 | 614 | 0.640 |
| 719 | 0.133 | 713 | 0.801 |
| 938 | 0.236 | 942 | 0.405 |
| 956 | 0.07 | 960 | 0.277 |
| 1290 | 0.341 | 1296 | 1.167 |
| 1453 | 0.158 | 1462 | 0.481 |
| 1559 | 0.14 | 1598 | 0.913 |

Table 1 suggests that at each frequency the drive shaft featuring the foamed damper achieves a more optimal damping ratio than a drive shaft having no damper.

Table 2 (below) compares the damping ratios at various similar frequencies for a drive shaft with a silicone rubber retaining member with a drive shaft containing a damper with three beads of foamed silicone.

TABLE 2

| Drive Shaft with Silicone Rubber Retaining Member | | Drive Shaft with Foamed Damper (3 Beads of Foam) | |
| --- | --- | --- | --- |
| Frequency (Hz) | Damping Ratio | Frequency (Hz) | Damping Ratio |
| 307 | 0.3623 | 303 | 0.7213 |
| 319 | 0.4787 | 317 | 0.6683 |
| 338 | 0.3857 | 337 | 0.5673 |
| 400 | 0.3147 | 381 | 2.1067 |
| 725 | 1.4933 | 726 | 1.9933 |
| 1094 | 1.9133 | 1047 | 0.7983 |
| 1320 | 1.3733 | 1300 | 0.7427 |
| 1483 | 1.5233 | 1466 | 0.6860 |
| 1775 | 0.7800 | 1780 | 0.3763 |

Table 2 suggests that, as compared to dampers having silicone rubber retaining members, foamed dampers provide superior reduction of NVH at lower frequencies (e.g., below about 750 Hertz). This surprising finding suggests that foamed dampers may be especially useful in reducing NVH caused by vibrations at lower frequencies (e.g., below about 750 Hertz).

U.S. Patent Application No. 61/143,610, which, as noted, is incorporated by reference, discloses additional drive-shaft-damper testing results.

It is within the scope of the present invention to pair within a drive shaft at least one foamed drive shaft damper according to the present invention with one or more other kinds of drive shaft dampers, such as those disclosed in commonly assigned International Publication No. WO 2008/005863 A2. As will be understood by those having ordinary skill in the art, different kinds of drive shaft dampers provide different NVH-reduction responses. Thus, it is thought that combining two or more different drive shaft damper designs might better dampen particular NVH-causing frequencies within a drive shaft. Moreover, it is within the scope of the present invention to include on the same drive shaft damper both extruded foam as herein disclosed and a non-foamed NVH-reducing retaining member to achieve similar results.

As noted, the drive shaft damper according to the present invention is typically inserted into a tubular drive shaft 100 before the drive shaft is swaged and thereafter subjected to heat treatment and aging. To endure the extreme heat-treatment conditions (e.g., temperatures greater than about 300° F.) required for modern drive shaft manufacturing, the foam 14 applied to the exterior of the substantially cylindrical structure 11 must be heat resistant. In particular, the heat-resistant foam must be able to endure an operating temperature of about 175° C. or more (i.e., greater than about 347° F.). Those having ordinary skill in the art will appreciate that 175° C. is above the serviceable temperature of EPDM and natural rubber, which represent alternative materials that have been used to secure a damper in place within a drive shaft. See R. A. Higgins, *Properties of Engineering Materials*, 2$^{nd}$ ed. Industrial Press Inc., 1994, p. 314.

For some applications, the heat-resistant foam will possess a maximum serviceable temperature (i.e., maximum operating temperature) greater than about 190° C. (i.e., greater than about 375° F.), typically greater than 200° C. (i.e., greater than about 390° F.), such as 205° C. (i.e., greater than about 400° F.). In other words, as used herein, the term "operating temperature" refers to those temperatures at which the heat-resistant foam continues to maintain its structural integrity and that effectively reduce NVH as part of the drive shaft damper.

For some extreme heat applications, the heat-resistant foam will possess a maximum serviceable temperature greater than about 250° C. (i.e., greater than about 480° F., such as 500° F. or more), typically greater than 275° C. (i.e., greater than about 525° F.), such as 285° C. (i.e., greater than about 545° F.).

Silicone-containing polymeric material, such as the foamed silicone that may be used in the present invention, is particularly suitable for a heat-resistant retaining member used to secure the damper within the drive shaft. In this regard, silicone-containing polymeric material is serviceable up to at least 285° C.

In addition, heat-resistant retaining members formed from silicone-containing polymeric material (e.g., foamed silicone) have been observed to possess enhanced dampening characteristics. This is unexpected.

As noted, in one embodiment of the present invention, the foam covers substantially the entire outer surface of the substantially cylindrical structure 11, typically in a constant foam thickness. See FIGS. 5B-5C.

Figure 10:
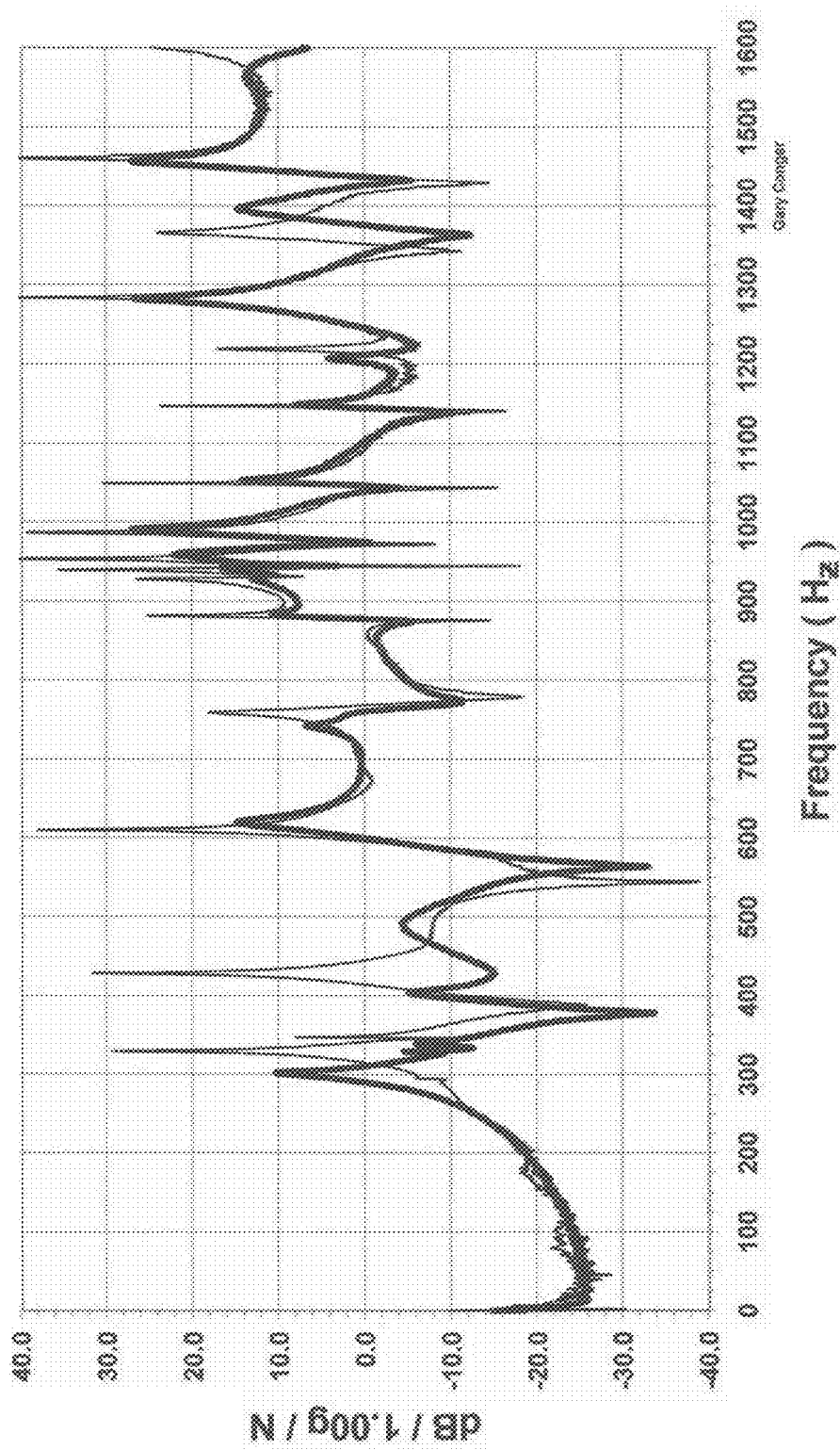
FIG. 10 depicts the improved dampening provided by an exemplary drive shaft damper (i.e., a damper having a length of 19.25 inches and positioned 5 inches from the end of a drive shaft) having foam substantially covering its entire outer surface (dark line) in comparison with a hollow aluminum tube (i.e., a 4.988×0.076×63.5-inch aluminum tube) (light line).
Figure 11:
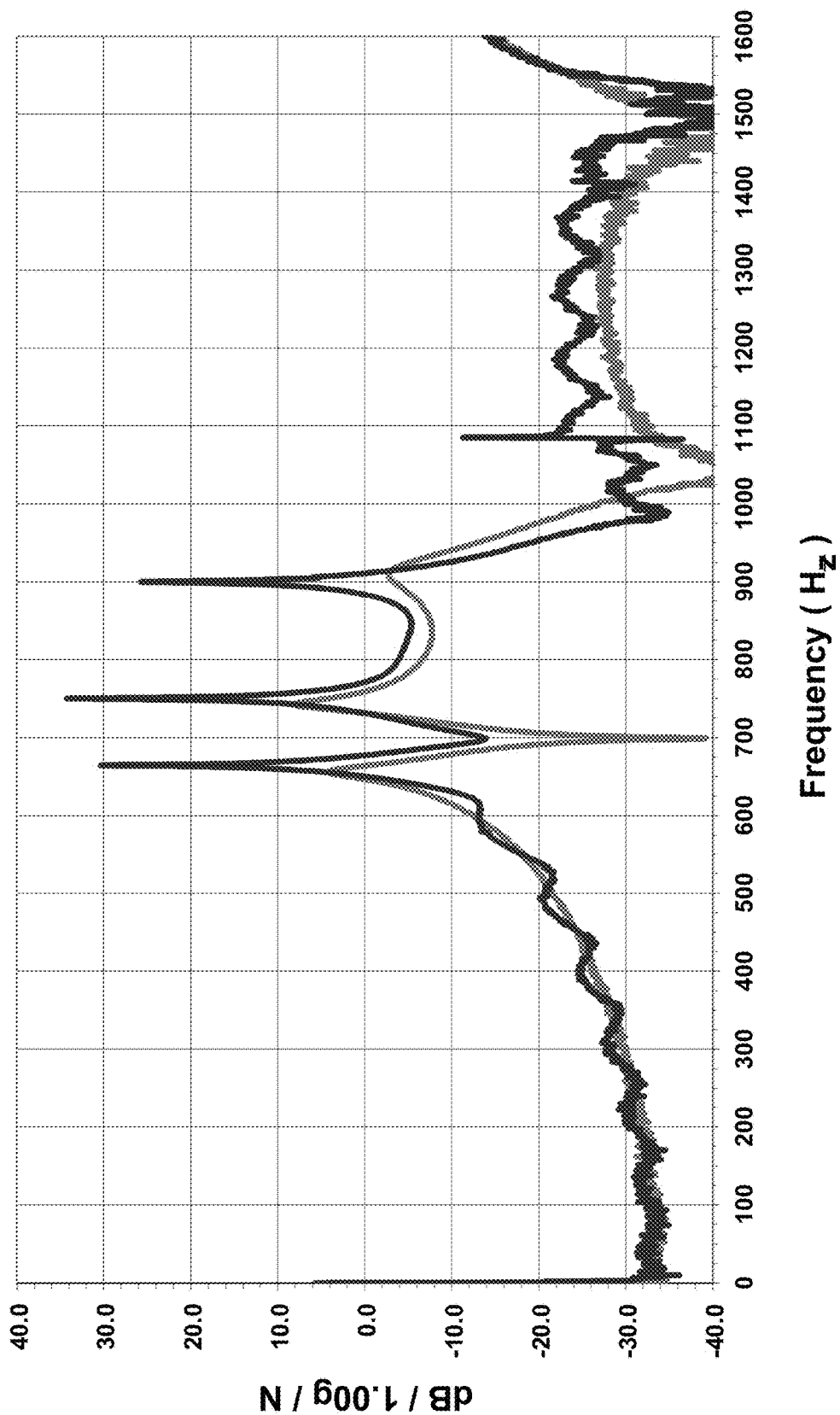
FIG. 11 depicts the improved dampening provided by an exemplary drive shaft damper (i.e., a damper having a length of 16 inches) having foam substantially covering its entire outer surface (light line) in comparison with a hollow steel tube (i.e., a 4×0.098×31.75-inch steel tube) (dark line).
Figure 12:
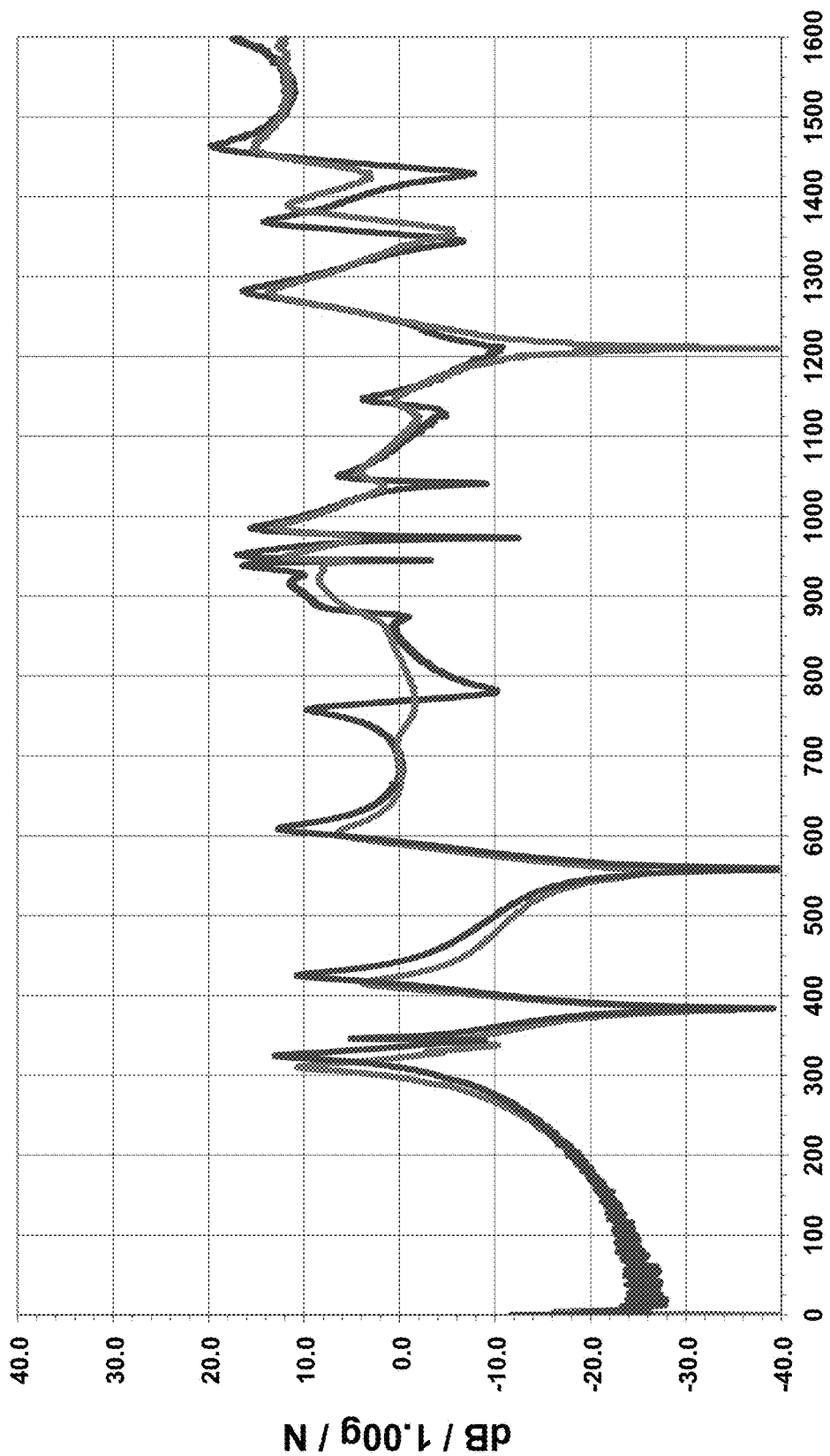
FIG. 12 depicts the improved dampening provided by an exemplary drive shaft damper (i.e., a damper having a length of 19.25 inches and positioned 5 inches from the end of a drive shaft within a 4.988×0.076×63.5-inch aluminum drive shaft) having foam substantially covering the entire outer surface of a paperboard tube (light line) in comparison with a solid-foam drive shaft damper (i.e., a 19.25-inch long damper lacking a cylindrical structure upon which the foam is applied) (dark line).
Figure 13:
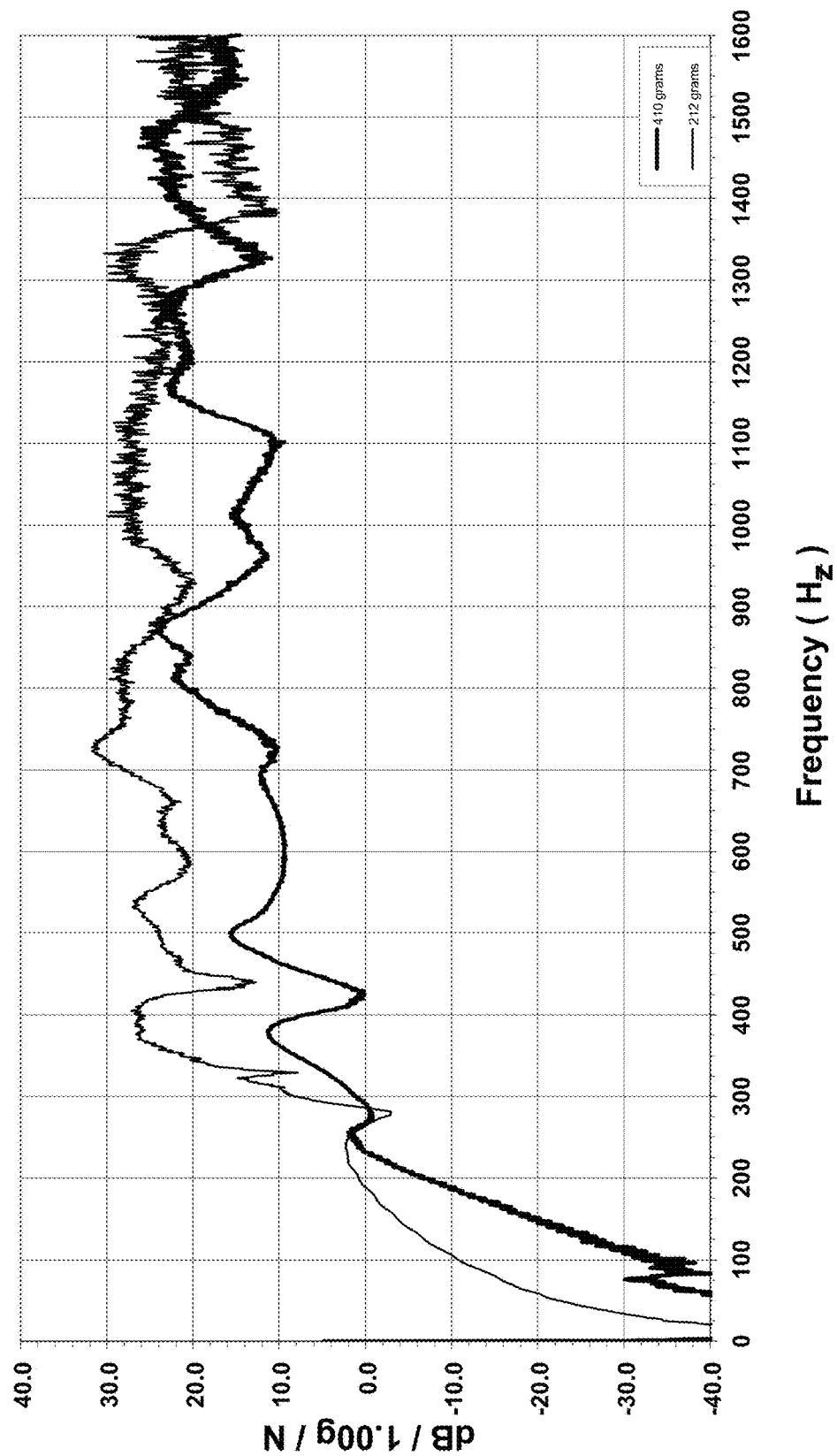
FIG. 13 depicts the dampening characteristics of a lower mass (i.e., 212 grams) drive shaft damper (light line) in comparison with a higher mass drive shaft damper (i.e., 410 grams) (dark line).

In this regard, it has now been observed that substantially covering the outer surface of a substantially cylindrical structure with a polyether foam (e.g., a charcoal polyether foam) provides enhanced dampening characteristics. Alternative foam materials (e.g., for forming an open-cell foam) include polyester foam, polyurethane foam, and silicone foam. Suitable foams (e.g., charcoal polyether foam) typically have (i) a density of between about 1.0 lb/ft$^3$ and 3.0 lbs/ft$^3$ (e.g., between about 1.05 lbs/ft$^3$ and 1.15 lbs/ft$^3$), (ii) an indent-force deflection at 25 percent of between about 28 psi and 36 psi, (iii) a tensile strength of at least about 10 psi, (iv) a tear strength of at least about 1.0 psi, and (v) a minimum elongation of at least about 100 percent. FIGS. 10-12 depict the improved dampening characteristics of such a drive shaft damper. FIG. 13 depicts that a drive shaft damper with a greater mass will typically provide improved dampening characteristics in comparison with a drive shaft damper having less mass. Accordingly, the present drive shaft dampers will have improved dampening in comparison with a solid foam drive shaft damper (i.e., a damper lacking a cylindrical structure upon which the foam is applied).

When installed on a cylindrical structure, the foam typically has a thickness of between about 0.25 inch and 2.0 inches. By way of illustration, a suitable cylindrical structure may be a paperboard tube having (i) a length of between about 12 inches and 52 inches (e.g., about 16 inches), (ii) a paper density of between about 3.3 lbs/1000 ft$^2$ and 3.7 lbs/1000 ft$^2$, and (iii) a tube wall thickness of between about 0.04 inch and 0.09 inch.

When the resulting drive shaft damper is installed in a drive shaft (e.g., a drive shaft having an outer diameter of between about 1.625 inches and 5.775 inches), the foam (e.g., a charcoal polyether foam) is typically compressed (e.g., due to an interference fit) between about 25 percent and 75 percent (e.g., 40-60 percent). By way of example, a drive shaft damper having a paperboard tube thickness of 0.07 inch and a foam thickness of 0.25 inch may be installed in a drive shaft having an outer diameter of 5 inches and a thickness of 0.083 inch. A paperboard tube inner diameter of 4.319 inches results in foam compression of 25 percent, a paperboard tube inner diameter of 4.444 inches results in foam compression of 50 percent, and a paperboard tube inner diameter of 4.569 inches results in foam compression of 75 percent. By way of further example, a drive shaft damper having a paperboard tube thickness of 0.07 inch and a foam thickness of 0.5 inch may be installed in a drive shaft having an outer diameter of 5 inches and a thickness of 0.083 inch. A paperboard tube inner diameter of 3.944 inches results in foam compression of 25 percent, a paperboard tube inner diameter of 4.194 inches results in foam compression of 50 percent, and a paperboard tube inner diameter of 4.444 inches results in foam compression of 75 percent.

Figure 14:
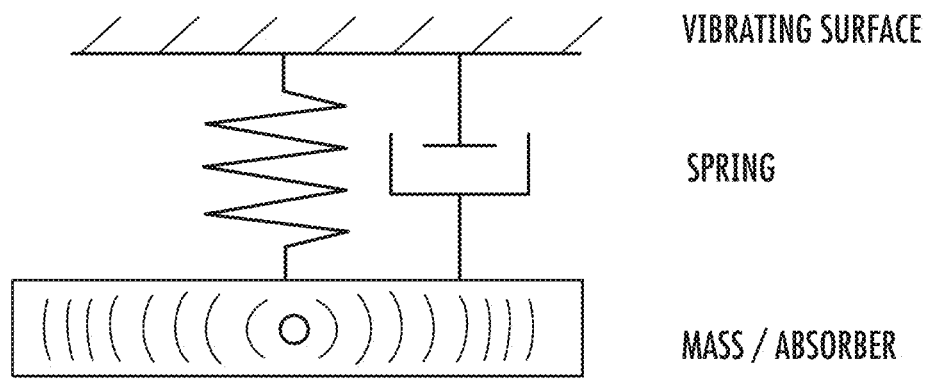
FIGS. 14-16 depict the dampening mechanisms provided by an exemplary drive shaft damper having foam substantially covering its entire outer surface.
Figure 15:
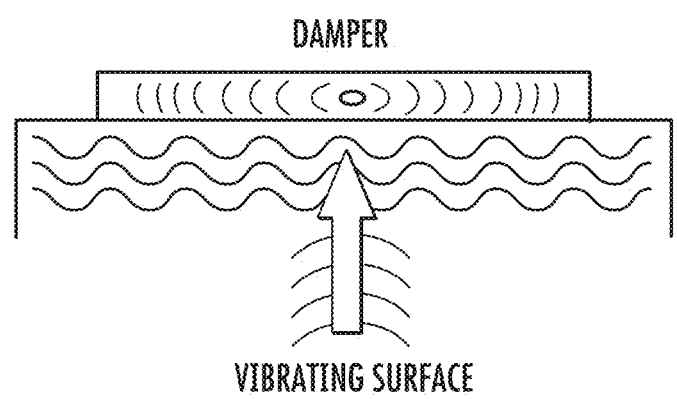
Figure 16:
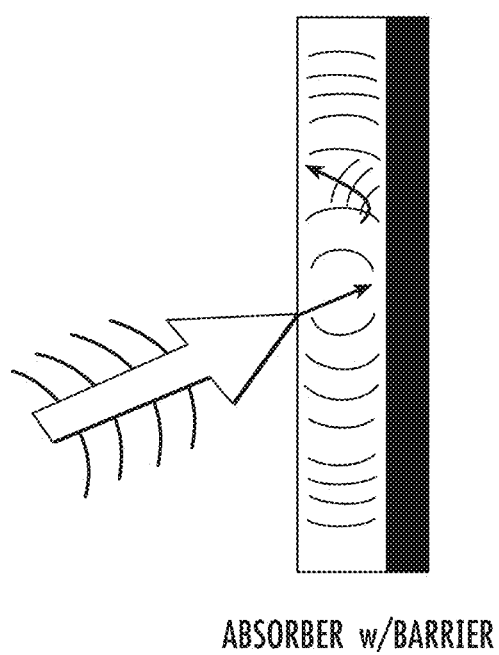

FIGS. 14-16 depict the dampening mechanisms provided by an exemplary drive shaft damper having foam substantially covering its entire outer surface. In this regard, the combination of a foam (e.g., a polyether foam) covering a cylindrical carrier structure (e.g., a paperboard tube) provides both active and passive dampening. As depicted in FIG. 14, the drive shaft damper provides a spring mass system whose oscillations quickly decay (e.g., due to spring rate and/or hysteresis damping) after being deflected because of contact between a vibrating drive shaft and the drive shaft damper. Although the foam transmits and absorbs much of the vibrational energy, the cylindrical carrier structure also functions to transmit and absorb vibrational energy, as well as to provide mass for the spring mass system. As depicted in FIG. 15, vibrational energy transmitted into the drive shaft damper is converted into heat energy (e.g., due to the flexing of the damper materials). As depicted in FIG. 16, vibrations within the drive shaft damper are continuously reflected until converted into heat energy.

This application incorporates entirely by reference the following commonly assigned patent applications and patent application publications: International Patent Application No. PCT/US07/72529 for Heat-Resistant Drive Shaft Damper Having Improved Dampening Performance, filed Jun. 29, 2007 (and published Jan. 10, 2008, as Publication No. WO 2008/005863 A2), and its continuation, U.S. patent application Ser. No. 12/256,553 for Heat-Resistant Drive Shaft Damper Having Improved Dampening Performance, filed Oct. 23, 2008 (and published Feb. 19, 2009, as Publication No. 2009/0048031 A1). This application also incorporates entirely by reference U.S. Pat. Nos. 5,904,622 and 6,234,911.

In the specification and/or figures, typical embodiments of the invention have been disclosed. The present invention is not limited to such exemplary embodiments. The figures are schematic representations and so are not necessarily drawn to scale.Unless otherwise noted, specific terms have been used in a generic and descriptive sense and not for purposes of limitation.

The invention claimed is:

1. An NVH-reducing drive shaft damper, comprising:
   a tubular structure defining an inner surface and an outer surface; and
   both (i) foam and (ii) a non-foamed retaining member positioned on the outer surface of said tubular structure;
   wherein said foam has (i) a density between 1.0 lb/ft$^3$ and 3.0 lbs/ft$^3$, (ii) a tensile strength of at least 10 psi, (iii) a tear strength of at least 1.0 psi, and (iv) a minimum elongation of at least 100 percent.

2. The drive shaft damper according to claim 1, wherein said foam possesses a maximum operating temperature of at least about 350° F.

3. The drive shaft damper according to claim 1, wherein said foam possesses a substantially constant thickness over the outer surface of said tubular structure.

4. The drive shaft damper according to claim 1, wherein said foam possesses variable thickness over the outer surface of said tubular structure.

5. The drive shaft damper according to claim 1, wherein said non-foamed retaining member is spirally wound around said tubular structure.

6. A dampened drive shaft possessing NVH-reduction, comprising (i) a tubular drive shaft defining an internal annular space and (ii) the drive shaft damper according to claim 1 compressively positioned and frictionally secured within said tubular drive shaft.

7. A vehicle comprising the dampened tubular drive shaft of claim 6, wherein the drive shaft damper's tubular structure and surficial foam are configured to dampen a problematic resonance frequency.

8. A dampened drive shaft possessing NVH-reduction, comprising (i) a tubular drive shaft defining an internal annular space, (ii) a first drive shaft damper according to claim 1 compressively positioned and frictionally secured within said tubular drive shaft, and (iii) a second drive shaft damper positioned within said tubular drive shaft, wherein said first drive shaft damper and said second drive shaft damper are differently configured.

9. A vehicle comprising the dampened tubular drive shaft of claim 8.

10. An NVH-reducing drive shaft damper, comprising:
    a paper tube having an inner surface and an outer surface; and
    both (i) foam and (ii) a non-foamed retaining member positioned on said paper tube;
    wherein said foam has (i) a density of at least 1.0 lb/ft$^3$, (ii) a tensile strength of at least 10 psi, (iii) a tear strength of at least 1.0 psi, and (iv) a minimum elongation of at least 100 percent.

11. The drive shaft damper according to claim 10, comprising smooth-surface paper forming the outer surface of said paper tube.

12. The drive shaft damper according to claim 10, wherein said paper tube comprises at least one corrugated paper ply.

13. The drive shaft damper according to claim 10, wherein:
    said paper tube is a spirally wound paper tube; and
    said non-foamed retaining member is spirally wound around said paper tube.

14. A dampened drive shaft possessing NVH-reduction, comprising (i) a tubular drive shaft defining an internal annular space and (ii) the drive shaft damper according to claim 10 compressively positioned and frictionally secured within said tubular drive shaft.

15. A vehicle comprising the dampened tubular drive shaft of claim 14, wherein the wall thickness of the drive shaft damper's paper tube and the density of the drive shaft damper's foam are configured to dampen a problematic resonance frequency.

16. An NVH-reducing drive shaft damper, comprising:
    a spirally wound paperboard tube having an inner surface and an outer surface;
    a non-foamed retaining member spirally wound around and secured to said paperboard tube, wherein said non-foamed retaining member extends above the outer surface of said paperboard tube; and
    foam positioned on the outer surface of said paperboard tube to substantially cover the remaining outer surface of said paperboard tube not covered by said non-foamed retaining member, wherein said foam extends above the outer surface of said paperboard tube and has an uncompressed thickness of between about 0.25 inch and 2.0 inches;

wherein said foam has (i) a density of at least 1.0 lb/ft$^3$, (ii) a tensile strength of at least 10 psi, (iii) a tear strength of at least 1.0 psi, and (iv) a minimum elongation of at least 100 percent.

17. The drive shaft damper according to claim 16, wherein smooth-surface paper forms the outer surface of said paperboard tube.

18. The drive shaft damper according to claim 16, wherein said foam has substantially constant uncompressed thickness over the outer surface of said paperboard tube.

19. A dampened drive shaft possessing NVH-reduction, comprising (i) a tubular drive shaft defining an internal annular space and (ii) the drive shaft damper according to claim 16 compressively positioned and frictionally secured within said tubular drive shaft, wherein said foam positioned on the outer surface of said paperboard tube is compressed between 25 percent and 75 percent as compressively positioned and frictionally secured within said tubular drive shaft.

20. A vehicle comprising the dampened tubular drive shaft of claim 19, wherein the wall thickness of the drive shaft damper's paperboard tube and the density of the drive shaft damper's foam are configured to dampen a problematic resonance frequency.

\* \* \* \* \*